United States Patent
Huang et al.

(10) Patent No.: US 12,065,067 B1
(45) Date of Patent: *Aug. 20, 2024

(54) MOVABLE SUPPORT SURFACES

(71) Applicant: APPLE INC., Cupertino, CA (US)

(72) Inventors: Athena Y. Huang, Palo Alto, CA (US); Tyson B. Manullang, San Jose, CA (US); Kurt R. Stiehl, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,031

(22) Filed: Mar. 24, 2023

Related U.S. Application Data

(63) Continuation of application No. 17/370,279, filed on Jul. 8, 2021, now Pat. No. 11,642,995.

(60) Provisional application No. 63/050,332, filed on Jul. 10, 2020.

(51) Int. Cl.
| | |
|---|---|
| *B60N 3/00* | (2006.01) |
| *A47B 13/08* | (2006.01) |
| *A47B 31/06* | (2006.01) |
| *A47B 21/02* | (2006.01) |

(52) U.S. Cl.
CPC ............ *B60N 3/001* (2013.01); *A47B 13/081* (2013.01); *A47B 31/06* (2013.01); *A47B 21/02* (2013.01)

(58) Field of Classification Search
CPC ....... B60N 3/001; A47B 13/081; A47B 31/00; A47B 21/00; A47B 9/00; A47B 2200/0066
USPC .......................... 108/44, 42, 50.01, 147, 143
See application file for complete search history.

(56) References Cited

U.S. PATENT DOCUMENTS

| | | | |
|---|---|---|---|
| 2,587,098 | A | 2/1952 | Binz |
| 3,224,391 | A | 12/1965 | Cooper |
| 3,391,960 | A | 7/1968 | Megargle et al. |
| 4,130,070 | A | 12/1978 | Herrin |
| 5,771,815 | A | 6/1998 | Leftwich |

(Continued)

FOREIGN PATENT DOCUMENTS

| | | |
|---|---|---|
| DE | 102018210991 B3 | 12/2019 |
| FR | 2907397 A1 | 4/2008 |

OTHER PUBLICATIONS

Todays Motor Vehicles, "Imagining autonomous/electric vehicle experiences in 2030", Feb. 28, 2020, Today's Motor Vehicles Magazine, Mar. 2020 Issue, https://www.todaysmotorvehicles.com/article/imagining-autonomouselectric-vehicle-experiences-in-2030/ (9 pp).

(Continued)

*Primary Examiner* — Jose V Chen
(74) *Attorney, Agent, or Firm* — Young Basile Hanlon & MacFarlane, P.C.

(57) ABSTRACT

A support surface includes a table top, moving portions, base portions, and sensors. The moving portions are configured to move the table top in multiple degrees of freedom. Each moving portion is configured to move the table top in a degree of freedom and prevent movement of the table top in other degrees of freedom. The base portions are coupled to the moving portions and are configured to support the moving portions. The sensors are configured to receive a user input and communicate the user input to the moving portions so that the moving portions move the table top based upon the user input.

20 Claims, 8 Drawing Sheets

(56) References Cited

U.S. PATENT DOCUMENTS

| | | | |
|---|---|---|---|
| 6,055,911 | A | 5/2000 | Krenzer |
| 7,100,515 | B2 | 9/2006 | Helm et al. |
| 7,930,952 | B2 | 4/2011 | Wang et al. |
| 8,141,499 | B2 | 3/2012 | Shoda et al. |
| 8,297,204 | B1 | 10/2012 | Giannoccora |
| 8,915,198 | B2 | 12/2014 | Massimini |
| 8,991,806 | B2 | 3/2015 | Meyer |
| 9,295,325 | B2 | 3/2016 | Luebke et al. |
| 10,017,193 | B2 | 7/2018 | Pailler et al. |
| 10,485,332 | B2 | 11/2019 | Luebke et al. |
| 11,642,995 | B1 * | 5/2023 | Huang .................. B60N 3/001 108/144.11 |
| 2009/0014932 | A1 | 1/2009 | Nikaido et al. |
| 2009/0293774 | A1 | 12/2009 | Cheung et al. |
| 2010/0201163 | A1 | 8/2010 | Dunkel |
| 2011/0036274 | A1 | 2/2011 | Poost et al. |
| 2013/0092059 | A1 | 4/2013 | Brutter et al. |
| 2014/0026788 | A1 | 1/2014 | Kallio, III et al. |
| 2015/0120238 | A1 | 4/2015 | Marvit et al. |
| 2015/0340892 | A1 | 11/2015 | Schreiner et al. |
| 2016/0051042 | A1 | 2/2016 | Koch |
| 2016/0260019 | A1 | 9/2016 | Riquelme Ruiz et al. |
| 2017/0265641 | A1 | 9/2017 | Hansen |
| 2017/0303680 | A1 | 10/2017 | Glöckl |
| 2018/0368569 | A1 | 12/2018 | Laing |
| 2019/0029412 | A1 | 1/2019 | Gibson et al. |
| 2020/0047641 | A1 * | 2/2020 | D'Eramo ................. B60N 2/06 |
| 2020/0104762 | A1 | 4/2020 | Gibson et al. |
| 2020/0146440 | A1 | 5/2020 | Fogarty et al. |
| 2020/0146442 | A1 | 5/2020 | Rutzke |
| 2020/0170407 | A1 | 6/2020 | Knapp et al. |
| 2020/0329860 | A1 | 10/2020 | Xiang |
| 2020/0329861 | A1 | 10/2020 | Zhang |
| 2021/0030146 | A1 | 2/2021 | Riebner et al. |
| 2021/0397246 | A1 | 12/2021 | Pettersson et al. |
| 2022/0080861 | A1 | 3/2022 | Hwang et al. |
| 2022/0240668 | A1 | 8/2022 | Hille |

OTHER PUBLICATIONS

You Tube, "2017 Volkswagon Multivan—INTERIOR", Aug. 31, 2016, https://www.youtube.com/watch?=v=npsRobwM0PY, (10 second to 43 second mark).

Volvo Cars, "Volvo 360c Interior Party", Sep. 5, 2018, Volvo Car USA Newsroom, https://www.media.volvocars.com/us/en-us/media/photos/237053/volvo-360c-interior10, (3 pp).

Forbes, Nargess Banks, "Insight: Volvo's Clean, Driverless, Role-Changing 360c Targets Air Travel", Oct. 22, 2018, https://www.forbes.com/sites/nargessbanks/2018/10/22/volvo-driverless-360c-car/?sh=731982d539d7 (6 pp).

* cited by examiner

US 12,065,067 B1

MOVABLE SUPPORT SURFACES

CROSS-REFERENCE TO RELATED APPLICATION(S)

This application is a continuation of U.S. application Ser. No. 17/370,279, filed Jul. 8, 2021, which claims priority to and the benefit of U.S. Provisional Application No. 63/050,332, filed Jul. 10, 2020, the entire disclosure of which is incorporated by reference herein.

TECHNICAL FIELD

This disclosure relates to support surfaces and, in particular, movable support surfaces.

BACKGROUND

Tables, such as tray tables, may be manually movable between a stored position (e.g., folded up) and an in-use position (e.g., folded down). However, such tables have very limited adjustability (e.g., moving between only the stored and in-use positions). Further, these tables may be moved, not according to the desired position of a user.

SUMMARY

Disclosed herein are implementations of vehicles and tables thereof and therefor.

In one implementation, a table for a vehicle includes a table top, a movement stage, a movement actuator, a first sensor, a second sensor, and a controller. The movement stage is coupled to the table top and configured to couple to a body structure of the vehicle. The movement stage is further configured to permit the table top to move in a degree of freedom. The movement actuator is operable to move the table top in the degree of freedom. The first sensor is for receiving a first user input. The second sensor is for receiving a second user input. The controller operates the movement actuator to move the table top according to the first user input received by the first sensor when the second user input is simultaneously received by the second sensor.

In one implementation, a table for a vehicle includes a table top, a movement stage, a movement actuator, a force sensor, and a controller. The movement stage is coupled to the table top and configured to couple to a body structure of the vehicle. The movement stage is further configured to permit the table top to move in a degree of freedom. The movement actuator is operable to move the table top in the degree of freedom. The force sensor is for measuring a force applied thereto by a user in the degree of freedom. The controller operates the movement actuator to move the table top according to the force measured by the force sensor.

In one implementation, a vehicle includes a body, a table, and a controller. The body defines a passenger compartment for transporting one or more passengers therein. The table is coupled to the body and positioned in the passenger compartment. The table includes a table top and a movement actuator. The movement actuator is operable to move the table top relative to the body. The controller operates the movement actuator according to a condition of the vehicle. The vehicle may further include a sensor for sensing a condition of the vehicle that is independent of the table, and the controller operates the movement actuator according to the condition sensed by the sensor.

DETAILED DESCRIPTION

Disclosed herein are embodiments of a vehicle and a movable table. More particularly, the table is movable by various actuators that are operated in response to user inputs for adjusting the position of the table. Various other sensors and/or systems of the vehicle may be utilized in controlling movement of the table. The table may also be usable independent of a vehicle.

Figure 1:
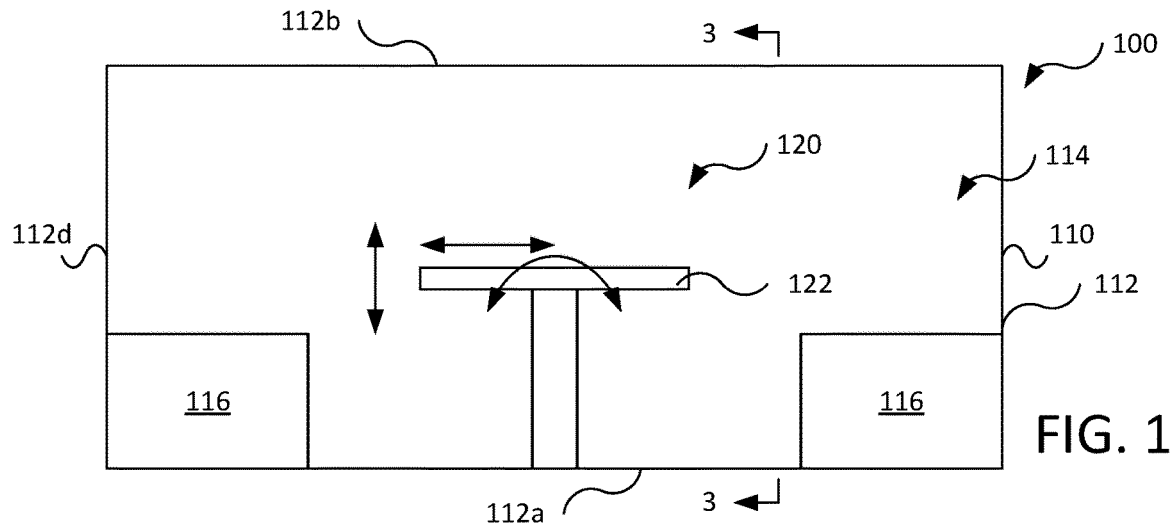
FIG. 1 is partial side view of a vehicle having a table.
Figure 2:
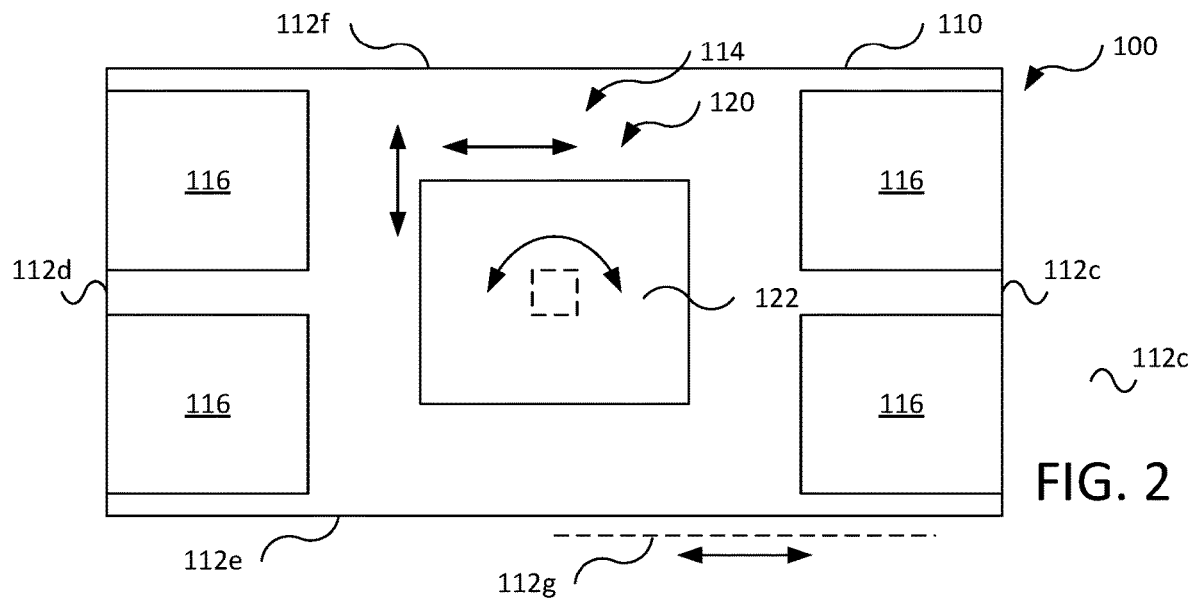
FIG. 2 is a partial top view of the vehicle of FIG. 1.
Figure 3:
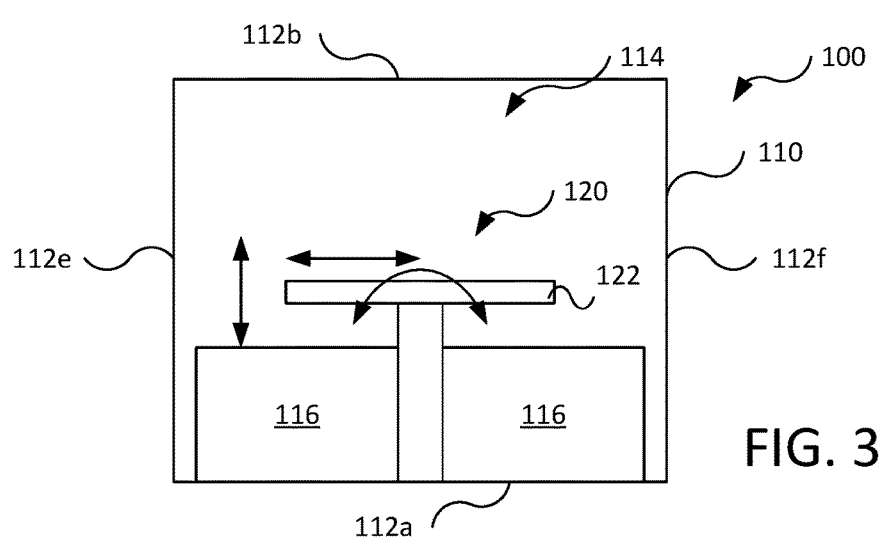
FIG. 3 is a partial cross-sectional view of the vehicle of FIG. 1 taken along line 3-3 in FIG. 1.

Referring to FIGS. 1-3, a vehicle 100 includes a body 110 and a table 120 that is movable and may be referred to as a movable table. The body 110 includes various body structures 112 that cooperatively define a passenger compartment 114 therebetween. The body structures 112 may, for example, include a lower body structure 112a (e.g., a floor), an upper body structure 112b (e.g., a roof), a forward body structure 112c, a rearward body structure 112d, a first outboard body structure 112e (e.g., on a right side of the vehicle body 110), and a second outboard body structure 112f (e.g., on a left side of the vehicle body 110). The body structures 112 may further include movable body structures that are movable to allow passengers to ingress and egress the passenger compartment 114, such as one or more doors 112g movably coupled (e.g., rotatably or slidingly) to others of the body structures 112 (e.g., the first outboard body structure 112e and/or the second outboard body structure 112f).

The vehicle body 110 also includes one or more seats 116 located in the passenger compartment 114. The seats 116 may be provided in any suitable arrangement. For example, the seats 116 may face both frontward and rearward toward each other (as generally shown in FIGS. 1 and 2) or all face forward. Furthermore, the seats 116 may be movable and/or reconfigurable (e.g., to face different directions, change position, and/or change shape, such as by reclining).

Figure 4:
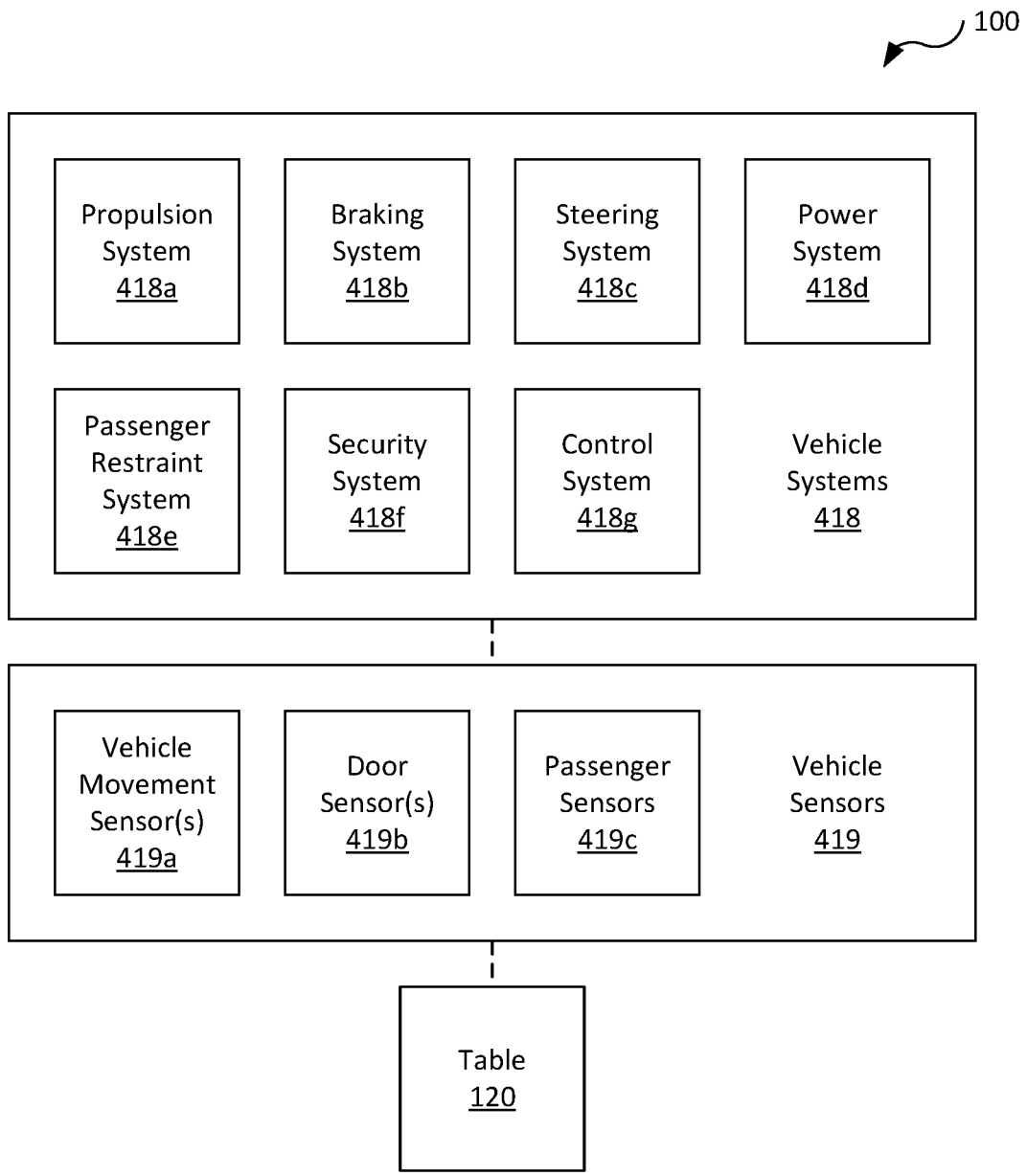
FIG. 4 is a schematic view of the vehicle of FIG. 1.

Referring to FIG. 4, the vehicle 100 further includes various vehicle systems 418 and vehicle sensors 419 for operating the vehicle 100, such as to travel along roadways. As will be discussed in further detail below, the vehicle sensors 419 used with the vehicle systems 418 may be further utilized for operating the table 120.

The vehicle systems 418 and components include, for example, wheels (not illustrated), a propulsion system 418a, a braking system 418b, a steering system 418c, a power system 418d, a passenger restraint system 418e, a security system 418f, and a control system 418g, among others. The propulsion system 418a includes suitable devices for (e.g., electric motor or engine and gearing) and is operatively coupled to the wheels (not illustrated) to propel the vehicle 100 along the roadway by rotating the wheels. The propulsion system 418a may be further configured to slow the vehicle 100 by way of regenerative braking. The braking system 418b is a friction braking system that includes suitable devices for (e.g., rotors and calipers associated with each wheel) and is operatively coupled to the wheels to slow the vehicle 100. The steering system 418c includes suitable devices for (e.g., a motorized rack and pinion) and is operatively coupled to the wheels to steer the vehicle 100 along a roadway by pivoting the wheels about substantially vertical axes (e.g., front ones the wheels). The power system 418d stores and delivers energy for use by the other vehicle systems 418 and, for example, includes one or more batteries for storing energy and appropriate circuitry delivering the energy. The passenger restraint system 418e includes suitable devices for restraining passengers in the vehicle 100 in the case of a high deceleration event, which may include seat belts and air bags that are operated in response to detection of the high deceleration event. The security system 418f is configured to provide security to the vehicle 100, for example, by monitoring and/or controlling the state of doors of the vehicle 100 (e.g., locked or unlocked, open or closed), the interior of the vehicle 100, and/or the exterior of the vehicle 100. The control system 418g is configured to operate the various other vehicle systems 418 of the vehicle 100. The control system 418g may be considered to include various subsystems, such as control systems or controllers (e.g., as described below with respect to FIG. 7) associated with each of the various vehicle systems 418 and/or components associated therewith. The control system 418g may be configured to receive user inputs and may be configured for autonomous or human operated control of the vehicle systems 418 for operating the vehicle 100.

The vehicle 100 further includes various of the vehicle sensors 419, which may be used with one or more of the vehicle systems 418 and/or be considered part of the vehicle systems 418. For example, the vehicle 100 may include one or more vehicle movement sensors 419a, one or more door sensors 419b, and/or one or more passenger sensors 419c. The vehicle movement sensor 419a may be used with and/or be considered part of the propulsion system 418a, the braking system 418b, and/or the steering system 418c to control movement of the vehicle 100, for example, to navigate the vehicle 100 along the roadway in a comfortable manner. The vehicle movement sensors 419a may, for example, include one or more accelerometers, one or more gyroscopes, and/or one or more positioning sensors (e.g., of a global positioning system). The same or another one or multiple ones of the vehicle movement sensors 419a may be used with and/or be considered part of the passenger restraint system 418e, for example, to control deployment of seatbelts and/or airbags upon detection of a high deceleration event (e.g., a vehicle impact).

The one or more door sensors 419b may be configured to monitor various states of the doors, for example, whether the doors are open, closed, opening, closing, locked, and/or unlocked. The one or more door sensors 419b may be used with and/or be considered part of the security system 418f, for example, to provide electronic and/or audible alerts if the vehicle 100 is tampered with.

The passenger sensors 419c are configured to monitor passengers, such as determining whether passengers are occupying different seats of the vehicle 100, classifying passengers (e.g., by size and/or seating position), and/or monitoring movements and/or behaviors of the passengers. The passenger sensors 419c may be used with and/or considered part of the passenger restraint system 418e, for example, indicating which of the passenger restraints are to be operated (e.g., for which seats) and the manner in which such passenger restraints are operated (e.g., for an in-position or out-of-position occupant). The passenger sensors 419c may include on or more weight-operated switches, scales, cameras, or other sensors suitable for monitoring and/or classifying passengers.

Referring again to FIGS. 1-3, the table 120 is provided in the passenger compartment 114. The table 120 includes a table top 122 that includes a generally planar upper surface and may have any suitable peripheral shape, such as substantially rectangular (as shown), circular, ovular, triangular, or other polygonal shape. The table top 122 is formed of a generally rigid material, such as a polymer, a composite, wood, glass, metal, or combination thereof, which is suitable for supporting objects thereon. In some embodiments, the table top 122 may be formed by or positioned over a display screen.

The table 120 and/or the table top 122 thereof is movable relative to the vehicle body 110 in any suitable combinations of degrees of freedom (DOF). Each degree of freedom is a predefined motion pattern. For example, as shown, the degrees of freedom may include or be selected from three translational degrees of freedom that are defined relative to a direction of travel of the vehicle, which include translation in a longitudinal axis (i.e., extending in a fore-aft direction of the vehicle body 110, which may be referred to as an X-axis), a lateral axis (i.e., extending in an inboard-outboard direction of the vehicle body 110, which may be referred to as a Y-axis), and/or a vertical axis that may be referred to as a Z-axis. The degrees of freedom may instead or additionally include or be selected from three rotational degrees of freedom about the longitudinal axis (e.g., referred to as roll), the lateral axis (e.g., referred to as pitch), and/or the vertical axis (e.g., referred to as yaw). For example, FIG. 1 illustrates the longitudinal degree of freedom, the vertical degree of freedom, and the pitch degree of freedom. FIG. 2 illustrates the longitudinal degree of freedom, the lateral degree of freedom, and the yaw degree of freedom. FIG. 3 illustrates the lateral degree of freedom, the vertical degree of freedom, and the roll degree of freedom. Other degrees of freedom are contemplated. For example, while the various degrees of freedom are generally described with respect to the direction of travel of the vehicle, the degrees of freedom may also be defined relative to other axes, relative to each other and/or be provided in other manners (e.g., translation along a predefined curved path may be considered a single degree of freedom, while causing translation and/or rotation in or about different axes of the vehicle 100).

Figure 5:
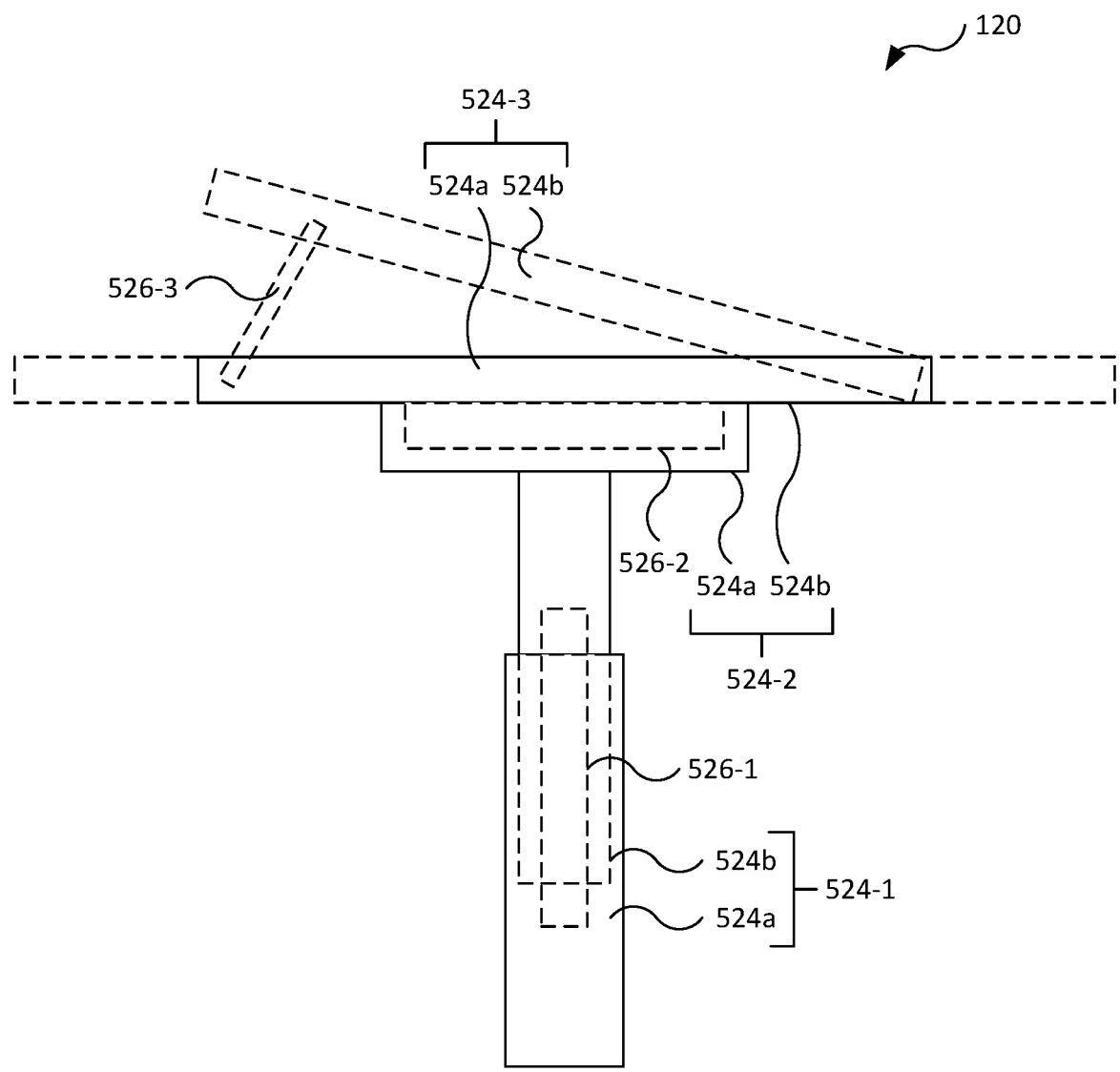
FIG. 5 is front view of a table of the vehicle of FIGS. 1-4 with hidden components illustrated in dashed lines and movable positions of components illustrated in dashed lines.

In one specific example, as shown in FIG. 5, the table top 122 is movable translationally in the lateral axis and the vertical axis (i.e., two degrees of freedom). Movement in the lateral axis and the vertical axis may, for example, facilitate ingress and/or egress from the passenger compartment 114 by providing passengers more clearance between the table top 122 and the seats 116 and/or openings for the doors 112g.

As is also shown in FIG. 5, the table top may also movable rotationally about the lateral axis (i.e., adding a third degree of freedom).

While three degrees of freedom are illustrated in FIG. 5 (i.e., the vertical, lateral, and pitch), other combinations of degrees of freedom are contemplated, such as vertical in combination with only lateral (e.g., as shown in FIG. 5, while omitting the rotational degree of freedom), or vertical in combination with lateral and longitudinal but not rotational.

The table 120 may be supported by any one or more of the body structures 112 previously described. As shown in FIGS. 1-3, the table 120 is mounted to the lower body structure 112a and is positioned longitudinally between the seats 116 and laterally between the outboard body structures 112e, 112f. In other examples, the table 120 may be mounted to and suspended under the upper body structure 112b, be mounted to and supported by any of the other body structures 112c-g, and/or be mounted to and supported by one or more of the seats 116. The table 120 may also be movable between a stowed position, such as hidden or against one of the body structures 112 or one of the seats 116.

Referring to FIG. 5, the table 120 further includes one or more movement stages 524 and one or more movement actuators 526 that are cooperatively configured to move the table top 122 in the one or more degrees of freedom. Each movement stage 524 is configured to permit movement in one degree of freedom and prevent movement in other degrees of freedom. Each of the movement stages 524 generally includes a base portion 524a and a moving portion 524b that is supported by and movable relative to the base portion 524a. The movement stages 524 may be interconnected, such that the moving portion 524b of one of the movement stages 524 forms or is coupled to the base portion 524a of another of the movement stages 524.

In the example shown in FIG. 5, the table 120 includes three movement stages 524. A first of the two movement stages 524 is a translational movement stage in the vertical axis, which may be referred to as a vertical movement stage 524-1. A second of the three movement stages 524 is a translational movement stage in the lateral axis, which may be referred to as a lateral movement stage 524-2. The moving portion 524b of the vertical movement stage 524-1 forms or is otherwise immovably coupled to the base portion 524a of the lateral movement stage 524-2. A third of the three movement stages is a rotational movement stage about the lateral axis (e.g., the pitch axis), which may be referred to as a pitch movement stage 524-3. The moving portion 524b of the lateral movement stage 524-2 forms or is otherwise immovably coupled to the base portion 524a of the pitch movement stage 524-3. The table top 122 may form or otherwise be immovably coupled to the moving portion 524b of the pitch movement stage 524-3.

Each of the movement actuators 526 is associated with one of the movement stages 524 and is configured to selectively cause movement thereof and, in particular, movement of the moving portion 524b relative to the base portion 524a in the degree of freedom defined thereby. The movement actuators 526 may be further configured to prevent movement in the degree of freedom of the movement stage 524 associated therewith, or another mechanism (e.g., a brake or locking device) may be further associated therewith and selectively operated to prevent movement of the movement stage 524, so as to hold the table top 122 in a static position. In the case of the movement stage 524 being translational, the movement actuator 526 may be any type of actuator capable of causing linear or other translational motion, such as a ball screw actuator, a lead screw actuator, an electromagnetic linear actuator (e.g., a linear motor), or a belt drive linear actuator. In the case of the movement stage 524 being rotational, the movement actuator 526 may be any type of actuator capable of causing rotational motion of the movement stage 524, such as a rotary actuator or any of the aforementioned linear actuators functioning as a strut-type actuator acting between the base portion 524a and the moving portion 524b (e.g., spaced apart from the hinge, as is shown in FIG. 5 for the pitch movement stage 524-3). The movement actuators 526 are generally contemplated as being electrically operated (e.g., the electric rotational or linear motor); however, other types of actuators are contemplated (e.g., pneumatic and/or hydraulic).

As referenced above, the table 100 is configured to couple to one or more of the body structures 112 of the vehicle 100, for example, with the base of one of the movement stages 524 or an intermediate structure being mounted to one of the body structures 112 (e.g., with fasteners). However, the table 100 is further contemplated as being usable independent of the vehicle 100 or any other vehicle, for example, instead or additionally being usable and/or configured to be used in a stationary environment, such as a building (e.g., a home residence or office building). In such case, the table 120 may configured to be mounted and/or supported by other structures, for example, the various movement stages 524 may be mounted to or form a base (e.g., having one or more legs, such as a single leg formed by the movement stage 524-1) that are configured to fixedly (e.g., with fasteners) or movably coupleable to (e.g., resting) on a support structure. Whether in use with the vehicle 100 or a building, the table 100 may be considered to be supported by a support structure, such as the body structures 112 of the vehicle 100 or a structure of the building (e.g., the movement stages 524 being supported by the support structure). Furthermore, the table 100 may be configured to be usable and movable between both a vehicle 120 and a building, for example, with the movement stages 524 being configured to fixedly couple to the body structure 112 in a removable manner (e.g., fasteners) and supportable by a building structure or intervening structure.

It is further contemplated that the table 120 omits the movement actuator 526 for one or more of the movement stages 524 in which case the user applies force to the table top 122 to move the table top 122, while the movement actuators 526 may be replaced with locking type actuators that only prevent movement in the associated degree of freedom. Movement may still be assisted in the degree of freedom via a passive device, such as a mechanical or pneumatic spring.

Figure 6:
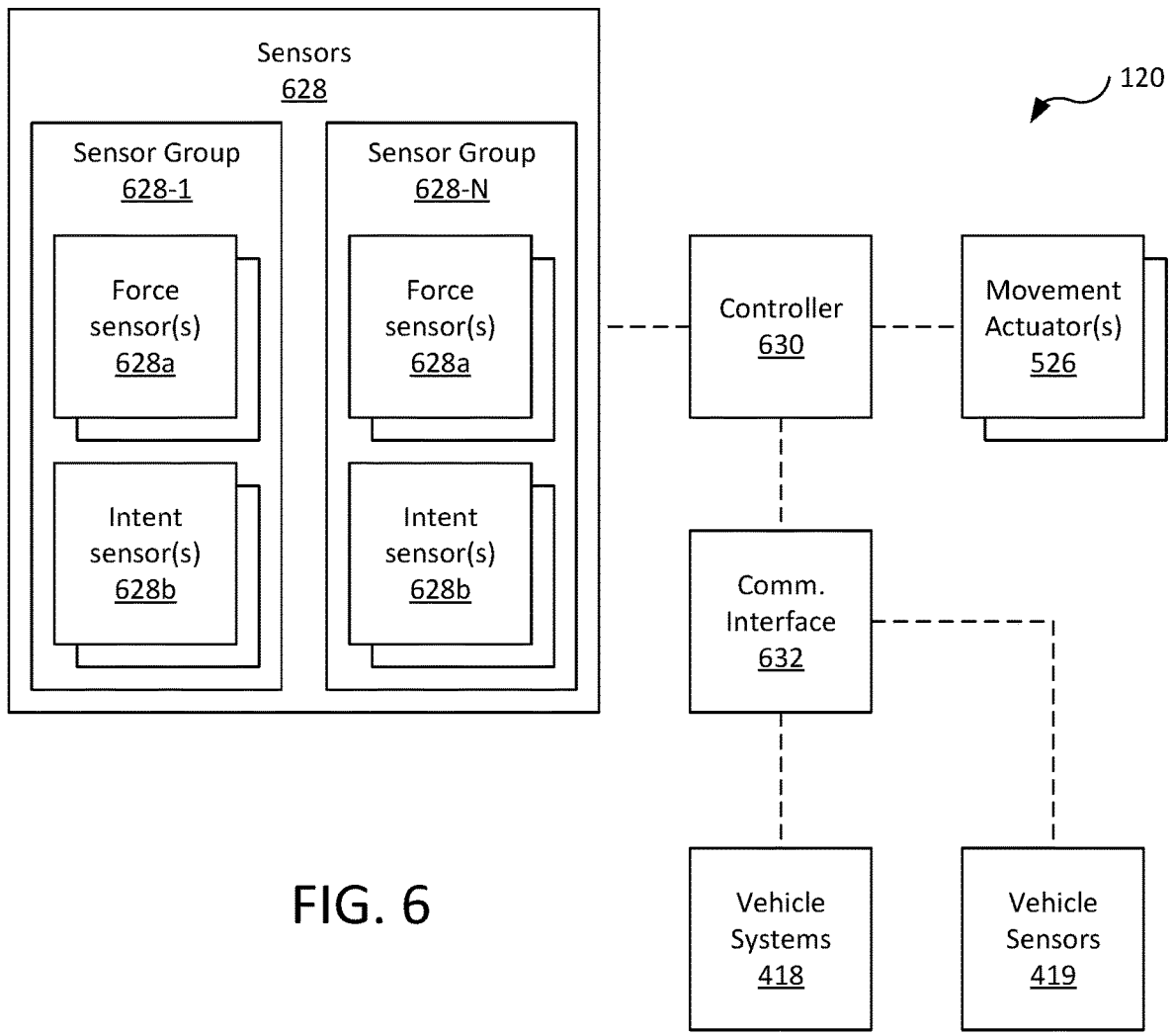
FIG. 6 is a schematic of electronic components of the table of FIG. 5.

Referring to FIG. 6, a schematic of electronic components of the table 120 is shown. The table 120, in addition to including the movement actuators 526, further includes one or more sensors 628 and a controller 630, and may also include a communications interface 632. The one or more sensors 628 are configured to sense user inputs and send user signals, indicative of the user inputs, to the controller 630. The controller 630, based on the user signals, then controls operation of the movement actuators 526, for example, by providing power thereto. The communications interface 632 is configured to receive signals from other sensors and devices, such as the control system 418g, the vehicle sensors 419 associated with the vehicle systems 418 and/or devices associated with passengers (e.g., computing devices, such as smartphones), which the controller 630 may use in operating the movement actuators 526.

The one or more sensors 628 of the table 120 are configured to receive user inputs for moving the table top 122, for example, to change the position of the table top 122 in the one or more degrees of freedom. Preferably, the position of the table top 122 may be moved to any position, within a range of travel, in each degree of freedom, thereby allowing the user to adjust the position in a generally unconstrained manner. Alternatively, the table top 122 may be configured to move to one of multiple predetermined positions within each travel (e.g., at the two ends of travel and one or more positions, therebetween).

The one or more sensors 628 include one or more force sensors 628*a*, which are configured to measure force applied thereto by the user, which may be used as inputs according to which the movement actuators 526 are operated. More specifically, the one or more force sensors 628*a* are configured to determine force inputs from the user in directions that generally correspond to each of the degrees of freedom of the movement stages 524 and the movement actuators 526 associated therewith. For example, each of the one or more force sensors 628*a* may be configured to measure force substantially in the direction of the degrees of freedom, such as a longitudinal force sensor and a vertical force sensor corresponding to the translational movement axis and the translational vertical movement axis. The force sensors 628*a* may be any suitable type sensor capable of measuring force, such as a strain gauge or piezoelectric type load cell.

The force sensors 628*a* may be considered to be devices that include both electronic components for measuring force (e.g., the strain gauge) and the mechanisms for applying the force to the electronic components to be measured thereby (e.g., a bending beam or S-beam). The force sensors 628*a* send force signals that communicate the force measured thereby (e.g., a force value or voltage), which the controller 630 uses in operating the movement actuators 526. The controller 630 may operate the movement actuators 526 with acceleration and/or velocity that is determined as a function of the force value. For example, the controller 630 may operate the movement actuators 526 to provide higher acceleration and/or velocity in the direction in which the user is applying the force, thereby reducing the force applied by the user and giving the user the impression that the table top 122 is light weight or weightless. An example physical configuration of the force sensors 628*a* is discussed in further detail below with respect to FIGS. 8 and 9.

The one or more sensors 628 may further include one or more intent sensors 628*b*, which are configured to determine intent of the user to provide inputs for moving the table 120. For example, the one or more intent sensors 628*b* may be used to determine whether the user intends to move the table 120 by causing the controller 630 to respond to or ignore inputs to the force sensors 628*a* or to activate the one or more force sensors 628*a*. In some cases, the intent sensors 628*b* may also be referred to as lockout sensors by preventing use or measurement of force inputs to move the table top 122. The intent sensors 628*b* may be provided in pairs such that both of the intent sensors 628*b* must detect the user in order for the controller to determine user intent to operate the moving actuators according to the force sensors 628*a*. The intent sensors 628*b* may be any suitable type or combination of types of sensors, such as touch sensors (e.g., capacitive sensors, pressure sensors, resistive sensors) or switches (e.g., buttons). In one example, the two intent sensors 628*b* of a pair may include two capacitive sensors or may be a capacitive sensor and a button. In other examples, the intern sensors 628*b* may be configured to identify gestures of the user, such as a predetermined sequence of inputs (e.g., taps) thereto, which may be used to perform certain functions (e.g., to prevent movement of the table top 122, cause movement of the table top 122 in a predetermined manner, such as to move laterally and/or vertically to facilitate egress of the passenger).

The intent sensors 628*b* may be considered to be devices that include both electronic components for measuring user input and the physical structures engaged by a user for providing the user input. For example, in the case of the intent sensors 628*b* being capacitive, the intent sensor 628*b* may be considered to include both the circuitry that measures capacitance (i.e., the electronic components) and an electrode (i.e., the physical structure) conductively coupled to the circuitry and which is interacted with by the user, for example, being directly engaged by the user or the user coming in close proximity thereto (e.g., being separated by a non-conductive layer of material that may also be considered part of the intent sensor 628*b* and through which capacitance is measured with the electrode).

The sensors 628 may be provided in sensor groups that are physically and/or functionally associated with each other, for example, to receive user inputs from different users situated at different positions around the table. For example, the sensors 628 may include sensor groups 628-1 through 628-N, where N is the number of sensor groups. Each of the sensor groups 628-1 to 628-N includes two or more sensors 628, such as one or more of the force sensors 628*a* (e.g., each associated with one of the degrees of freedom and/or the movement actuators 526) and one or more of the intent sensors 628*b* (e.g., a pair of the intent sensors 628*b*). The number of sensor groups (N) may be any suitable number, such as two (e.g., one sensor group associated with each of two opposite sides of the table top 122), four (e.g., one sensor group associate with each of four sides or each of four corners of the table top 122), or other suitable number (e.g., three, five, or more).

The sensors 628 within each of the sensor groups 628-1 to 628-N may be functionally associated with each other by requiring input to the one or more intent sensors 628*b* of the sensor group to operate the movement actuators 526 according to the one or more force sensors 628*a* of that same sensor group. For example, if user intent to move the table top 122 is determined from the intent sensors 628*b* of a first of the sensor groups 628-1 and not from an Nth of the sensor groups 628-N (e.g., a second sensor group), the movement actuators 526 are operated according to only the one or more force sensors 628*a* of the first sensor group 628-1 but not those of the second sensor group 628-2.

The sensors 628 within each of the sensor groups 628-1 to 628-N may also be physically associated with each other. For example, the force sensors 628*a* and the intent sensors 628*b* of one sensor group may be mechanically coupled to transfer force therebetween, such that force applied by the to the intent sensors 628*b* is transferred to the force sensors 628*a* to be measured thereby. Furthermore, the force sensors 628*a* of one sensor group may be mechanically isolated from the intent sensors 628*b* of another sensor group. For example, if the user applies force to the intent sensors 628*b* of a first of the sensor groups 628-1, such force transfers to the force sensors 628*a* of the first sensor group 628-1 but not to the force sensors 628*a* of an Nth of the sensor groups 628-N (e.g., a second sensor group). In other examples, a sensor group may include a single user intent sensor 628*b* that is not physically associated with the one or more force sensors 628*a* of the same sensor group, so as to receive separate user inputs that may be used to confirm user intent.

It is further contemplated that the force sensors 628a may be functionally and mechanically associated with multiple different sets of the intent sensors 628b (e.g., multiple different pairs of intent sensors), for example by locating the intent sensors 628b at different positions on the table top 122 and arranging a single set of force sensors between the table top 122 and the movement stages 524. As a result, when the user engages the intent sensors 628b of either set, force is transferred to the same force sensors 628a. Such an arrangement, however, may be less accurate than the sensor groups described previously with such force measurements incorporation motion and mass of the table top 122, for example, arising from motions of the vehicle 100.

While the sensors 628 and the sensors groups 628-1 to 628-N are described above as including both one of more of the force sensors 628a and one or more of the intent sensors 628b, other configuration of the sensors 628 are contemplated. In one example, the sensors 628 may include only one or more touch sensors (e.g., capacitive, resistive, and/or buttons, as described above for the intent sensors 628a), which are configured to receive user inputs for operating the table 120. For example, the table 120 may include multiple touch sensors, each of which may be pressed alone (i.e., without pressing another of the touch sensors or other user in put sensor) and in response to which the table top 122 is moved by the movement actuators 526 in a corresponding direction (e.g., up, down, left, right, front, back, yaw, pitch, roll), according to a predetermined pattern (e.g., a predetermined distance in any one or more of the directions), and/or a user-defined pattern. In still further examples, as referenced above, the touch sensors may be configured to detect gestures according to which the table top 122 is moved in different predetermined or user-defined manners, such as shorter and longer-duration presses, taps of different sequence (e.g., number of times being pressed and/or duration of presses) or sliding along a sensor (e.g., detecting the user in different areas of the touch sensor, such as along an edge of the table top 122). In another example, the sensors 628 may not include or not require user input to the intent sensors 628b, instead operating the actuators 526 according to the force sensors 628a alone. In a still further example, the sensors 628 may include one of the intent sensors 628b for each of the force sensors 628.

The one or more sensors 628 of the table 120 may further include other types of sensors, such as position sensors, accelerometers, gyroscopes, or microphones, which are separate from the vehicle sensors 419. The position sensors may be used in operating the one or more movement actuators 526, for example, slowing or stopping movement when approaching or reaching and end of travel of the movement stage 524 associated therewith. The accelerometers and/or gyroscopes may sense motion of the table 120 in real space, which may include movement of the vehicle 100, the output of which may be used in evaluating user inputs to the one or more force sensors 628a (e.g., reducing noise of the force measurements) and/or to assess movement of the vehicle 100 to determine circumstances in which the table 120 should not move (e.g., in high acceleration event). The microphones may be provided as a user input, for example, allowing users to provide voice commands for operating the table 120.

Figure 13:
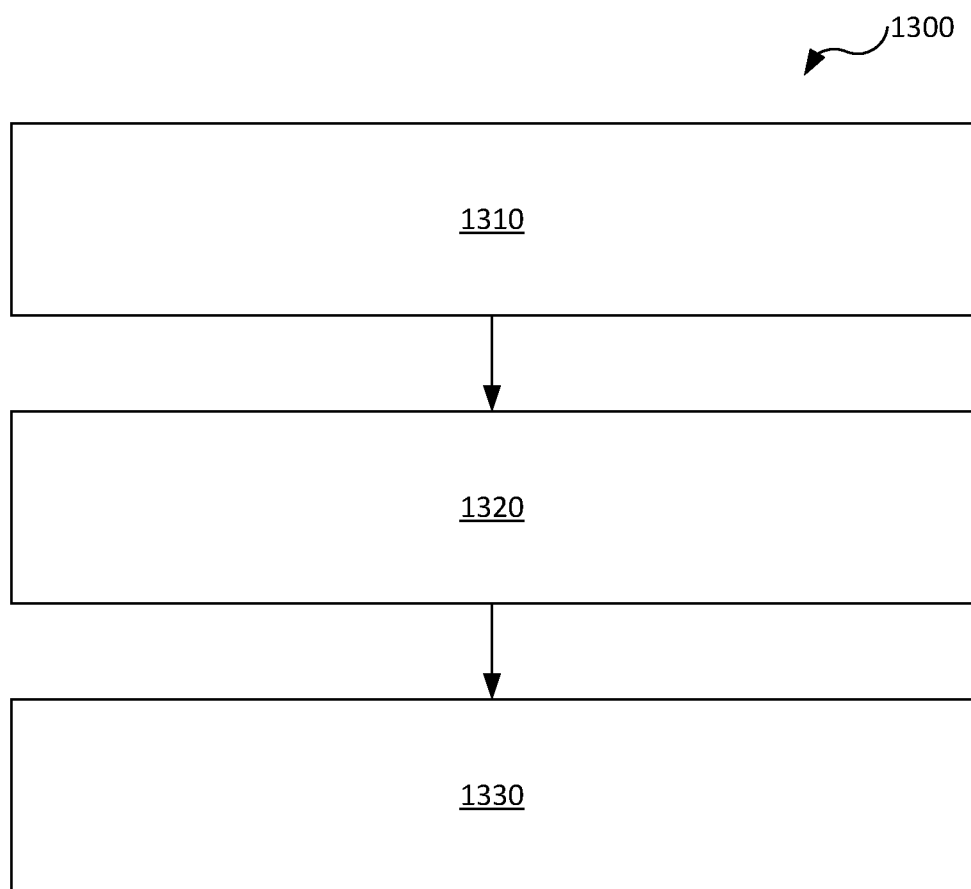
FIG. 13 is a flowchart of a method for operating a table and a vehicle system according to a vehicle condition.

Still referring to FIG. 6, the table 120 may further include a communications interface 632 by which the controller 130 may receive signals from other sources, such as the vehicle systems 418 and/or the vehicle sensors 419 or another computer device associated with the user (e.g., a smartphone) by which the user may provide permissions or inputs for operating the table 120. For example, upon detection of a high acceleration event, which may be detected with the vehicle movement sensor 419a that may be used with the passenger restraint system 418e or other vehicle system 418, the controller 630 may determine that the table top 122 should not be moved (e.g., according to forces measured by the force sensors 628a even if user intent to move the table is determined with the one or more intent sensors 628b). A high acceleration event may be determined, for example, by comparing the measured acceleration to a threshold value, which may be the result of a sharp turn, hard braking, hard acceleration, or an impact. In another example, table 120 may be configured to move automatically to facilitate ingress of passengers in response to the door sensor 419b indicating that the door is being opened, for example, moving the table top 122 away from the door 112g that is being opened. In a still further example, the table 120 may be configured to move according to the occupants of the vehicle 100, which may be detected by the passenger sensors 419c, such as to prevent or limit movement of the table top 122 toward the occupant and/or to prevent automated movement (e.g., for ingress, as described previously) if an occupant is detected in proximity to the table top 122. Refer to FIG. 13 for further discussion of operating the table 120 according to inputs from the vehicle sensors 419 and the vehicle systems 418.

Figure 7:
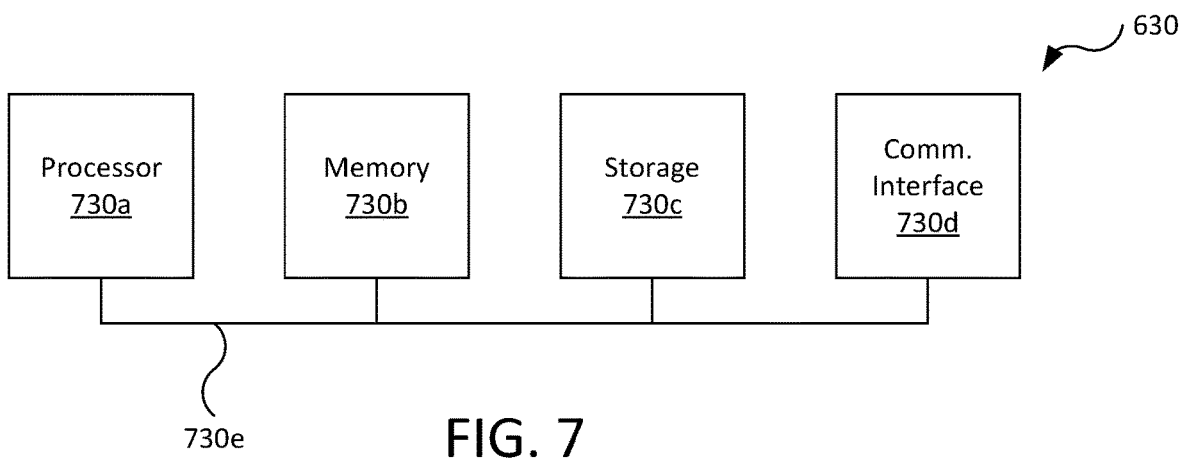
FIG. 7 is an example schematic of a hardware configuration of a controller of the table of FIG. 6.

Referring to FIG. 7, an example hardware configuration is described for the controller 630. The controller may be any suitable computing device configured to implement the apparatuses and methods described herein. In one example, the controller 630 generally includes a processor 730a, a memory 730b, a storage 730c, a communications interface 730d, and a bus 730e by which the other components are coupled to each other. The processor 730a may be any suitable processing device capable of executing instructions contained in software programming, such as a central processing unit (CPU). The memory 730b is a volatile, short-term memory device, such as a random-access memory module or component. The storage 730c is a non-volatile, long-term storage device for storing instructions to be executed by the processor 730a, such as a hard disk drive or solid state drive. The communications interface 730d may, for example, include an input and an output by which signals are sent to and from the controller 630.

Figure 8:
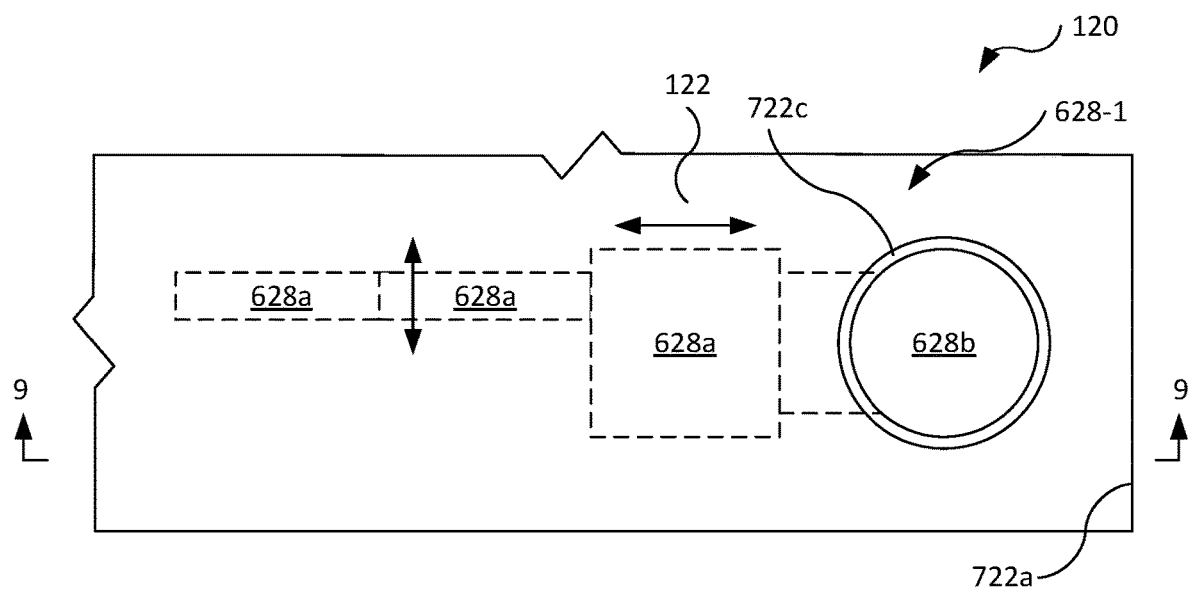
FIG. 8 is a partial top view of the table of FIG. 5 with hidden components illustrated in dashed lines.
Figure 9:
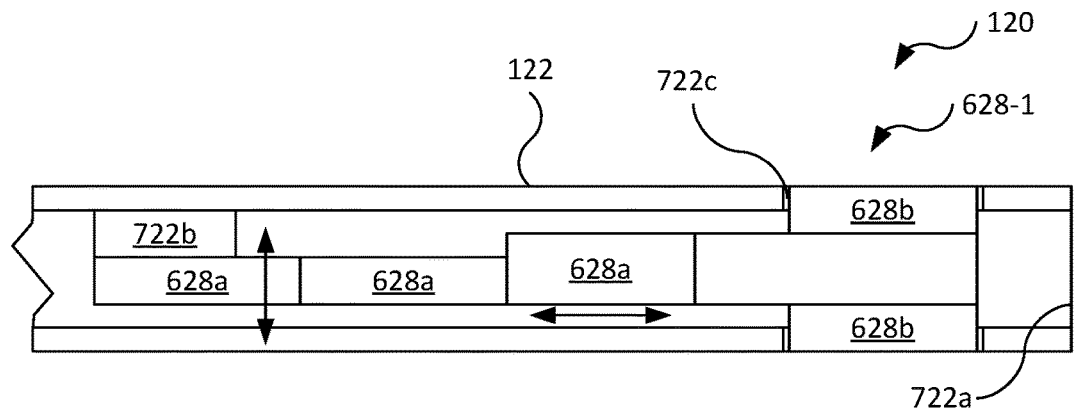
FIG. 9 is a partial cross-sectional view of the table of FIG. 5 taken along line 9-9 in FIG. 7.

Referring to FIGS. 8 and 9, one example is illustrated for a physical arrangement of the sensors 628 of one of the sensor groups that is referred to as the sensor group 628-1. As shown in FIG. 9, two of the intent sensors 628b are provided in upper and lower locations, respectively. The intent sensor 628b in the upper location, which may be referred to as the upper intent sensor 628b, is configured to receive user input from the upper side of the table top 122. The upper intent sensor 628b may have an upper surface that is inset and coplanar or otherwise flush with an upper surface of the table top 122. The intent sensor 628b in the lower location, which may be referred to as the lower intent sensor 628b, is configured to receive user input from the lower side of the table top 122. The upper location is positioned above the lower location, such that both the upper and lower intent sensors 628b simultaneously detect the user (e.g., the hand of the user) when grasping the edge of the table. The upper intent sensor 628b and the lower intent sensor 628b of the sensor group 628-1 (e.g., the electrodes thereof) may be considered to horizontally overlap and/or vertically aligned.

The intent sensors 628b are located in close proximity to edges 722a of the table to 122, thereby allowing the user to touch both the upper and the lower intent sensors 628b with a single hand, for example, when grasping the edge of the table top 122. For example, the upper and lower intent sensors 628b of a pair (e.g., of a common sensor group) may be located within three inches, two inches, one inch, or less of one or more edges 722a of the table top 122.

While illustrated as having a circular shape and arranged in a corner of the table top 122 (e.g., proximate two edges 722a thereof), the intent sensors 628b may have any suitable shape or position, further examples of which are discussed in further detail below with respect to FIGS. 10-12.

Still referring to FIGS. 8 and 9, the sensor group 628-1 may further include three of the force sensors 628a, each of which is configured to measure force in one of three different translational degree of freedom (e.g., longitudinal, lateral, and vertical, as described previously). Each of the force sensors 628a may, for example, be a bending beam load cell or an S-beam load cell. The force sensors 628a illustrated in FIGS. 8 and 9 include, moving left to right in the figures, two bending beam load cells and an S-beam load cell, which measure force in the vertical, longitudinal, and the lateral axes, respectively (e.g., as indicated by arrows). The force sensors 628a are mechanically connected in series and connected to a ground 722b thereof, which may be an internal structure or internal surface of the table 120 (e.g., of the table top 122 or one of the movement stages 524). Thus, as a user applies force to the distal-most one of the force sensors 628a relative to the ground 722b of the table 120, the force is transferred in series through each of the other force sensors 628a and reacts against the ground 722b and is ultimately transferred to the movement stage 524. The force sensors 628a may be positioned below an upper surface of the table top 122, so as to be hidden from view and/or to prevent direct physical interaction therewith by the user.

As referenced above, the intent sensors 628b may be mechanically coupled to the force sensors 628a, such that force applied by the user to the intent sensors 628b is transferred to and measured by the force sensors 628a. As shown, the upper and lower intent sensors 628b of the sensor group are coupled to the distal-most force sensor 628a relative to the ground 722b. The intent sensors 628b, while being inset and coplanar with the upper surface of the table top 122, are configured to transfer force applied by the user to the force sensors 628a substantially without transferring force directly the surface of the table top 122 immediately adjacent thereto. That is, the force is transferred from the intent sensors 628b, which may be considered a user input structure of the force sensors 628a, to the force sensor 628a substantially independent of the table top 122. For example, as shown, a gap 722c (e.g., a peripheral gap) may be arranged between the table top 122 and the upper intent sensor 628b, which may be filled with a compressible and/or flexible material (e.g., a rubber or foam; not labeled). As force is applied to the upper and lower intent sensors 628b, the upper and lower intent sensors 628b move very slightly vertically, longitudinally, and/or laterally relative to the table top 122 without transferring force directly thereto, but sufficiently for force to be transferred to and measured by the force sensors 628a.

Figure 10:
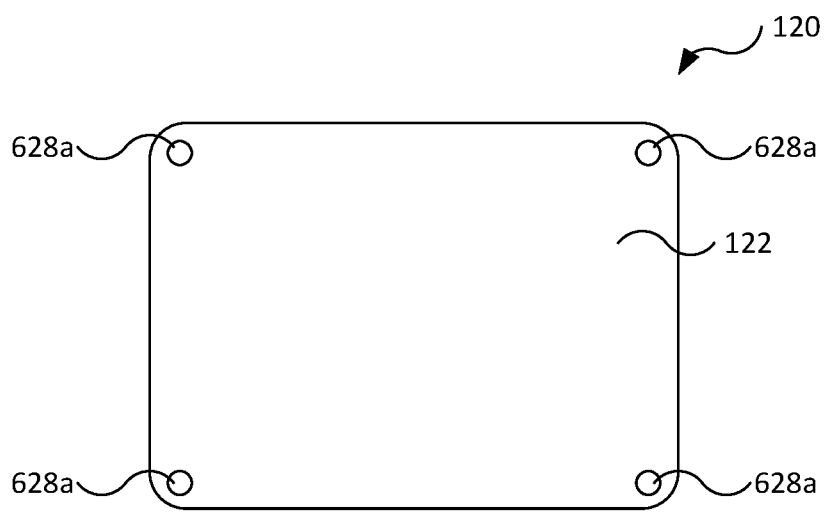
FIG. 10 is a top view of the table of FIG. 5 with sensors in a first arrangement.
Figure 11:
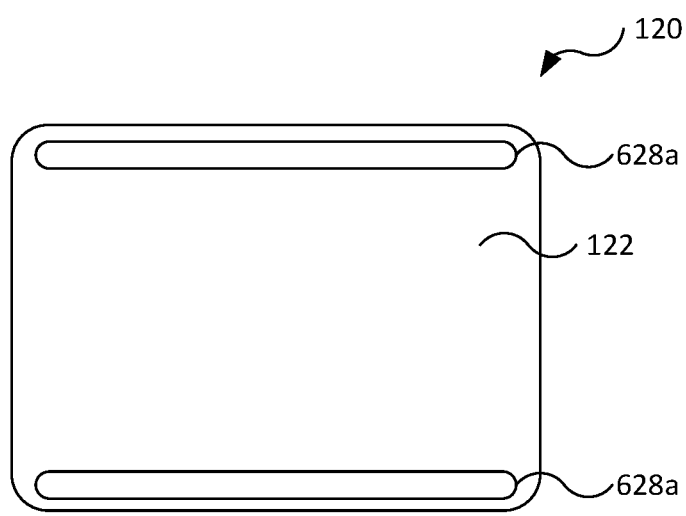
FIG. 11 is a top view of the table of FIG. 5 with sensors in a second arrangement.
Figure 12:
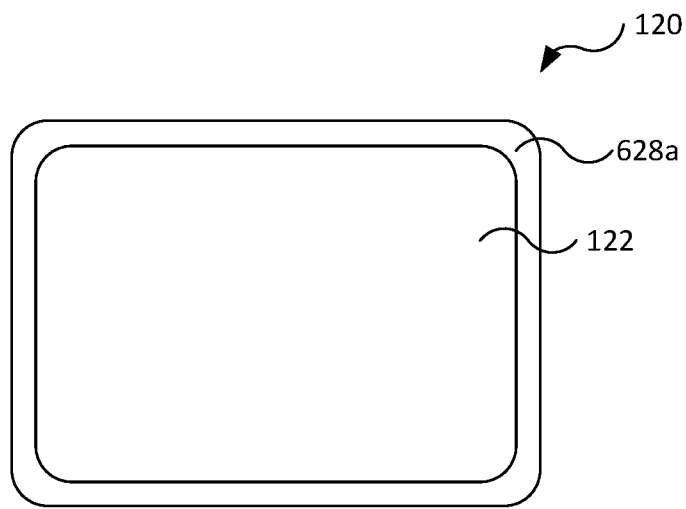
FIG. 12 is a top view of the table of FIG. 5 with sensors in a third arrangement.

Referring to FIGS. 10-12, the upper intent sensors 628b, the lower intent sensors 628b, and/or the sensor groups thereof may be shaped, sized, and positioned relative to the table top 122 in various different manners. For example, as shown in FIG. 10, each of four upper intent sensors 628b is circular and relatively small compared to the lateral and longitudinal dimensions of the table top 122 (e.g., being less than 10% thereof), but may be any other suitable shape (e.g., rectangular or oval) and/or larger. Each of the upper intent sensors 628b is inset relative to the edges 722a of the table top 122, such as being positioned in a corner of the table top 122, proximate the edges 722a thereof. The position of the lower intent sensor 628b and/or the force sensors of the sensor group associated thereof may be as described above. As shown in FIG. 11, each of the two upper intent sensors 628b is elongated, being inset from and extending along one of the edges 722a of the table top 122 (e.g., the forward and rearward edges, as shown). For example, each of the upper intent sensors 628b may extend a majority or more (e.g., 60%, 75%, or more) or a length of the edge 722a along which the upper intent sensor 628b extends. The lower intent sensor 628b may be configured as described above (e.g., being positioned below the upper intent sensors 628b). Furthermore, the upper and lower intent sensors 628b may be configured to determine a location at which the user is providing input, for example, requiring input at proximate locations along the edge 722a to determine user intent and/or to operate the movement actuators 526. The force sensors 628a may be configured as described previously and/or additional ones of the force sensors 628a for one or more axes may be mechanically coupled to the intent sensors 628b at different locations to more accurately measure force applied by the user at different locations along the edge 722a of the table top 122. As shown in FIG. 12, the upper intent sensor 628b may extend outward to and/or form one or more (e.g., four or all) edges 722a of the table top 122. The lower intent sensors 628b may be configured as described above, including with respect to FIG. 11. The force sensors 628a may also be configured as described above, including being provided at various locations (e.g., relative to the edges 722a of the table top 122).

Referring to FIG. 13, as referenced above, the table 120 is configured to move according to one of the vehicle sensors 419, which may be part of or used with another of the vehicle systems 418. In various implementation, the table 120 may be moved in response to the other vehicle sensor 419 or may be prevented from moving in response to the other vehicle sensor 419. More specifically, the controller 630 may control operation of the one or more movement actuators 526, either by causing or preventing operation thereof, in response to a condition of the vehicle 100 detected with the other vehicle sensor 419 (e.g., upon the condition meeting a criterion). The other vehicle sensor 419 may be used with one or more of the other vehicle systems 418 that are otherwise operated independent of the table 120.

As referenced above, the other vehicle sensor 419 may be one or more of the vehicle movement sensor 419a, the door sensor 419b, or the passenger sensor 419c. The vehicle movement sensor 419a may, for example, be an accelerometer used to determine whether acceleration of the vehicle 100 meets a high acceleration criterion (e.g. a threshold acceleration) and may otherwise be used with the passenger restraint system 418e (e.g., to cause operation of a seat belt or an airbag, which may be a at a different threshold acceleration value) or another of the vehicles systems 418 (e.g., to control the propulsion system 418a, the braking system 418b, and/or the steering system 418c), for example, to navigate a roadway. The high acceleration condition may, for example, indicate that a sharp turn, bump, hard braking, hard acceleration, or an impact, which may have different predetermined acceleration thresholds in one or more axes. The vehicle movement sensor 419a may send an acceleration signal with an acceleration value or an indication that the acceleration has exceeded the predetermined acceleration threshold directly or indirectly, such as with another vehicle system 418 (e.g., the control system 418g).

The acceleration signal is received by the table 120, such as with the communications interface 632 or the controller 630, and the controller 630 controls operation of the movement actuators 526 according to the acceleration signal, for example, permitting operation thereof if the acceleration does not exceed an acceleration threshold and/or preventing operation thereof if the acceleration does exceed the acceleration threshold. It should be noted that the acceleration threshold by which the table 120 is operated may be different and, in particular, significantly lower than another acceleration threshold by which the passenger restraint system 418e might be operated.

The door sensor 419b is configured to detect a condition of the door 112g of the vehicle 100, which may be whether the door is open, closed, is opening, is closing, is locked, or is unlocked. The door sensor 419b may otherwise be used with the security system 418f (e.g., to provide a notification to the user) or another of the vehicle systems 418 (e.g., to prevent operation of the propulsion system 418a when the door 112g is open). The door sensor 419b may send a door signal communicating the door condition directly or indirectly, such as with another vehicle system 418 (e.g., the passenger restraint system 418e or the control system 418g).

The door signal is received by the table 120, such as with the communications interface 632 or the controller 630, and the controller 630 controls operation of the movement actuators 526 according to the door signal. For example, upon receiving a signal that the door 112g is open (or is opening) or otherwise meets a criterion, the controller 630 may operate the movement actuators 526 to move the table top 122 to facilitate ingress of the passenger to the one of the seats 116, for example, by moving the table top 122 away from the door 112g and/or raising the table top 122 relative to the seat 116.

The passenger sensor 419c is configured to detect a condition of the passengers, which may be whether a passenger is occupying one of the seats 116. The passenger sensor 419c may, for example, be a switch, a scale, or a camera. The passenger sensor 419c may otherwise be used with the passenger restraint system 418e, for example, to determine whether to deploy a passenger restraint (e.g., a seat belt or airbag) associated with one of the seats 116. The passenger sensor 419c may send a passenger signal communicating the passenger condition (e.g., an occupancy condition of a seat) directly or indirectly, such as with another vehicle system 418 (e.g., the security system 418f or the control system 418g).

The passenger signal is received by the table 120, such as with the communications interface 632 or the controller 630, and the controller 630 controls operation of the movement actuators 526 according to the passenger signal. For example, upon receiving a passenger signal that indicates the passenger is occupying one of the seats 116 proximate the table 120 or satisfies another criterion, the controller 630 may limit or prevent movement toward the passenger (e.g., preventing lowering the table top 122 onto legs of the user and/or preventing longitudinal movement of the table top 122 into a torso of the user). In another example, upon receiving a passenger signal that indicates the passenger is occupying one of the seats 116, the controller 630 may prevent an automated movement of the table top 122 (e.g., in response to the door sensor 419b), so as to prevent moving the table top 122 that might be in use by the passenger.

Referring to FIG. 13, a method 1300 for operating a movable table of a vehicle generally includes sensing 1310 a condition of the vehicle, operating 1320 the movable table according to the condition, and performing another operation 1330 with another system of the vehicle according to the condition.

The sensing 1310 of a condition is performed by a vehicle sensor, such as one of the vehicle sensors 419. As described above, the condition may be an acceleration condition sensed by a vehicle movement sensor, such as the vehicle movement sensor 419a, which is used by another vehicle system, such as the passenger restraint system 418e or the propulsion system 418a. As described above, the condition may be a door condition sensed by a door sensor, such as the door sensor 419b, which is used by another vehicle system, such as the security system 418f. As described above, the condition may be a passenger condition sensed by a passenger sensor, such as the passenger sensor 419c, which is used by another vehicle system, such as the passenger restraint system 418e.

The operating 1320 of the table according to the condition is performed by one or more movement actuators that move a table top of the table, such as the movement actuators 526, as operated by a controller, such as the controller 630. The condition may be communicated from the vehicle sensor, directly or indirectly, to the controller of the table via a condition signal. The operating may include causing or preventing operation of the movement actuators in the manners described above. The operating 1320 may be performed according to the method 1400 described below.

The performing of another operation 1330 according to the condition is performed with another vehicle system, such as one of the vehicle systems 418, which may be operated by another control system, such as the control system 418g. As described above, the other vehicle system may be the passenger restraint system 418e, the propulsion system 418a, the security system 418f, or another of the vehicle systems 418 described previously. The performing of another operation 1330 may be performed at a different time than the operation 1320 of the table.

Figure 14:
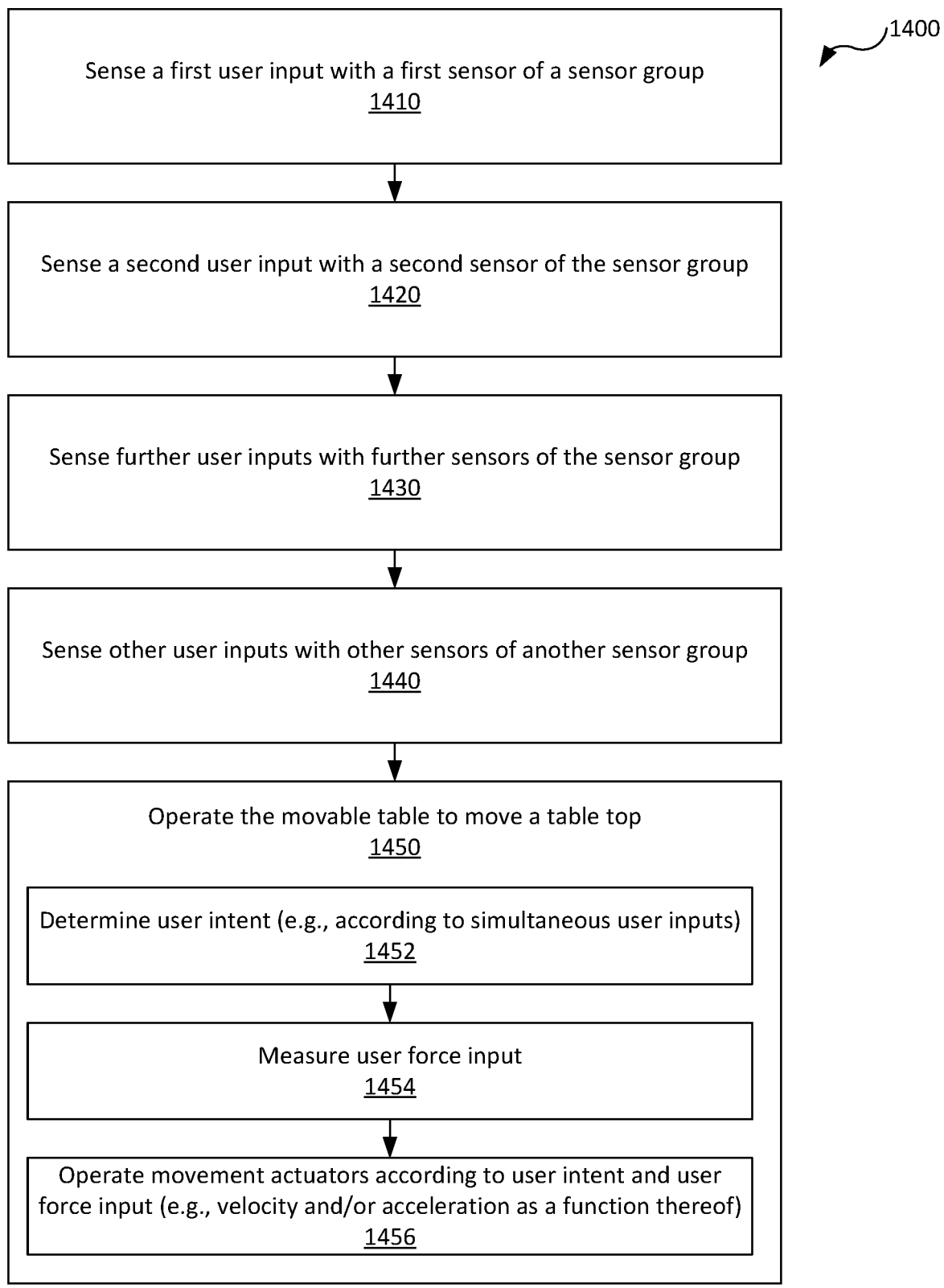
FIG. 14 is a flowchart of another method for operating a table.

Referring to FIG. 14, as referenced above, the table 120 is configured to move according to simultaneous user inputs to two or more of the sensors 628 of the table 120. For example, the controller 630 may operate the one or more movement actuators 526 when user inputs are simultaneously by two or more of the sensors 628 of one or more sensor groups. Each sensor group may include one of the intent sensors 628b and one or more of another of the intent sensors 628b (e.g., requiring simultaneous user input to two of the intent sensors 628b), one or more force sensors 628a (e.g., requiring simultaneous user input to the intent sensor 628b and one or more force sensors 628a), or both (e.g., requiring simultaneous user input to the two of the intent sensors 628b and one or more of the force sensors 628a). In the case of each sensor group including two of the intent sensors 628b, the intent sensors 628b may be upper and lower intent sensors 628b that may be vertically aligned. In the case of multiple sensor groups, the intent sensors 628b thereof are in different locations on the table top 122.

Still referring to FIG. 14, a method 1400 for operating a movable table of a vehicle generally includes sensing 1410 a first user input, sensing 1420 a second user input, may further include sensing 1430 one or more further user inputs, may further include sensing 1440 other user inputs with sensors of another sensor group, and operating 1450 the movable table according to the first, second, and further user inputs, or the other user inputs. The method 1400 may be performed as the operating 1320 of the movable table in the method 1300 (e.g., preventing the operating 1330 of the movable table according to the vehicle condition).

The sensing 1410 of the first user input is performed with a first sensor of the table, which is a user intent sensor, such as the user intent sensor 628b of a sensor group. The user input is sensed, for example, when the user touches the user intent sensor 628b (e.g., capacitance exceeds a threshold or a button is pressed).

The sensing 1420 of the second user input is performed with a second sensor of the table, which may be another user intent sensor, such as another user intent sensor 628b of the same sensor group, or a force sensor, such as the force sensor 628a, of the same sensor group. In the case of the user intent sensor, the user input is sensed, for example, when the user touches the user intent sensor 628b. In the case of the force sensor 628a, the user input is sensed as force applied or otherwise transferred to the force sensor 628a.

The sensing 1430 of the one or more further user inputs is performed with one or more further sensors (e.g., third, fourth, fifth, etc. sensors) of the same sensor group. With the addition of the further sensors, the sensor group includes two of the user intent sensors 628b and one or more of the force sensors 628a. The sensing 1430 is optionally performed if the table includes the further sensors.

The sensing 1440 of the user inputs may be performed with the sensors of another sensor group, which may include the same combination of sensors of the first sensor group (e.g., the first sensor, the second sensor, and the further sensors, if included). The sensing 1440 is optionally performed if the table includes multiple sensor groups.

The operating 1450 of the movable table is performed by moving actuators that are operated to move a table top, such as the movement actuators 526 and the table top 122. The moving actuators are operated by a controller, such as the controller 630, according to the first, second, and further user inputs (if provided) or the other user inputs (if provided) if sensed simultaneously.

For example, the operating 1450 may include determining 1452 user intent, measuring 1454 user input force, and operating 1456 the movement actuators according to the user input force if the user intent is determined, which may be performed according to the sensors of the first sensor group or the other sensor group (if provided).

The determining 1452 of the user intent is performed by the controller according to the first sensor and the second sensor. For example, if user inputs are received simultaneously by both the first sensor and the second sensor (e.g., two user intent sensors, or a user intent sensor and a force sensor that receives a separate input from the user intent sensor), user intent is determined.

The measuring 1454 of the user input force is performed by the one or more force sensors (e.g., the second sensor or the further sensors). In one example, the measuring 1454 may be performed only when the user intent is determined from during the determining 1452 (i.e., the user inputs to the user intent sensors and the force sensors are simultaneously sensed). In another example, the measuring 1454 is performed irrespective of whether user intent is determined.

The operating 1456 of the movement actuators is performed by the movement actuators, such as the movement actuators 526 as operated by the controller, according to both the determining 1452 of the user intent and the measuring 1454 of the user input force. If user intent is not determined, the movement actuators are not operated. If intent is determined, the movement actuators are operated according the measuring 1454 of the user input force.

For example, the acceleration or speed of the movement actuators may be determined by the controller as a function of the user input force. By moving the table top 122 with quicker acceleration and/or at faster rates according to higher input forces, the table top 122 is moved away from the force and may have a tendency to reduce the user input force.

As described above, one aspect of the present technology is the gathering and use of data available from various sources, sensors or user profiles, to operate portions of the movable table, the passenger restraint system, or other vehicle systems. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of personal information data, in the present technology, can be used to the benefit of users. For example, the personal information data can be used to customization operation, for example, of the movable table, the passenger restraint system, or other vehicle systems according to user information. Other uses for personal information data that benefit the user are also possible. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user-profile-based safety systems, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can be implemented without the need for accessing such personal information data. That is, the various embodiments of the present technology are not rendered inoperable due to the lack of all or a portion of such personal information data. For example, the movable table, the passenger restraint system, or other vehicle systems can be operated based on non-personal information data, a bare minimum amount of personal information, other non-personal information available to the system, or publicly available information.

What is claimed is:

1. A table, comprising:
   a table top;
   moving portions configured to move the table top in multiple degrees of freedom, wherein each moving portion is configured to move the table top in a degree of freedom and prevent movement of the table top in other degrees of freedom;
   base portions coupled to the moving portions that are configured to support the moving portions; and
   sensors configured to receive a user input and communicate the user input to the moving portions so that the moving portions move the table top based upon the user input, wherein each of the sensors measures a force input from a user in the degree of freedom of a corresponding moving portion and the corresponding moving portion is configured to move the table top based on the force input measured in the degree of freedom.

2. The table of claim 1, wherein the moving portions includes a vertical moving portion coupled to a vertical base portion, and wherein the vertical moving portion is configured to move the table top along a vertical axis of the table top.

3. The table of claim 2, wherein the moving portions further include a lateral moving portion coupled to a lateral base portion, and wherein the lateral moving portion is configured to move the table top laterally along a horizontal axis of the table top that is substantially perpendicular to the vertical axis of the table top.

4. The table of claim 3, wherein the moving portions further include a pitch moving portion coupled to a pitch base portion, and wherein the pitch moving portion is configured to rotate the table top about a lateral axis of the table top that is substantially perpendicular to the vertical axis of the table top.

5. The table of claim 1, further comprising actuators that are configured to move the moving portions relative to the base portions.

6. The table of claim 1, wherein each moving portion is configured to move the table top in a different degree of freedom.

7. The table of claim 1, wherein the table top is configured to move in three degrees of freedom.

8. The table of claim 1, wherein the corresponding moving portion is configured to move the table top in the degree of freedom with a velocity, an acceleration, or both as a function of the force input measured in the degree of freedom.

9. The table of claim 1, wherein the sensors include force sensors that are configured to measure a force input from a user and intent sensors that are configured to determine a location of the user input.

10. A table for a vehicle, the table comprising:
    a table top; and
    a moving portion configured to move the table top in a degree of freedom and prevent movement of the table top in other degrees of freedom,
    wherein the moving portion moves the table top in the degree of freedom based upon a signal from a table sensor associated with a user input to the table top,
    wherein the table sensor is configured to measure a force input from a user and the moving portion is configured to move the table top in the degree of freedom with a velocity that is greater than a velocity of the force input of the user, and
    wherein the moving portion operates the table top based upon a signal from a vehicle sensor of the vehicle.

11. The table of claim 10, wherein the moving portion is configured to move the table top based upon the signal received by the vehicle sensor or the moving portion is configured to prevent movement of the table top based upon the signal received by the vehicle sensor.

12. The table of claim 10, wherein the signal from the vehicle sensor is indicative of an acceleration condition of the vehicle, a door condition of a door of the vehicle, or a passenger occupancy condition of the vehicle.

13. The table of claim 10, wherein the table sensor is configured to measure a force input from a user, and wherein the moving portion is configured to move the table top in the degree of freedom with a velocity, an acceleration, or both as a function of the force input measured by the table sensor.

14. The table of claim 10, wherein the moving portion is coupled to an actuator, and wherein the actuator is configured to move the moving portion relative to a base portion.

15. The table of claim 14, wherein the base portion is configured to remain stationary during movement of the moving portion.

16. A table for a vehicle, comprising:
    a table top; and
    a moving portion coupled to a base portion and configured to move the table top in a degree of freedom relative to the base portion, wherein the moving portion operates the table top based upon a signal of a vehicle sensor that is indicative of an acceleration condition of the vehicle, and the moving portion is configured to operate the table top based upon comparing the acceleration condition to a threshold acceleration value.

17. The table of claim 16, wherein the moving portion is configured to prevent movement of the table top when the acceleration condition exceeds a threshold acceleration value.

18. The table of claim 17, wherein the moving portion permits movement of the table top when the acceleration condition is at or below the threshold acceleration value.

19. The table of claim 16, wherein the table includes a sensor and the moving portion is configured to move the table top based upon a user input received by the sensor and based upon the signal of the vehicle sensor that is indicative of the acceleration condition of the vehicle.

20. The table of claim 16, wherein the moving portion further operates the table top based upon a second signal of a second vehicle sensor that is indicative of a door condition of a door of the vehicle or a passenger occupancy condition of the vehicle.

* * * * *